(12) United States Patent
De Souza et al.

(10) Patent No.: US 10,737,768 B2
(45) Date of Patent: Aug. 11, 2020

(54) ENHANCED TAKEOFF TRIM INDICATION

(71) Applicant: Embraer S.A., São José dos Campos-SP (BR)

(72) Inventors: Sérgio Luiz Miranda De Souza, São José dos Campos (BR); Eduardo Alves Menini, São José dos Campos (BR); Lumi Galadriel Silva Morimitsu, São José dos Campos (BR)

(73) Assignee: Embraer S.A., Sao Jose dos Campos-SP (BR)

( * ) Notice: Subject to any disclaimer, the term of this patent is extended or adjusted under 35 U.S.C. 154(b) by 0 days.

(21) Appl. No.: 15/674,051

(22) Filed: Aug. 10, 2017

(65) Prior Publication Data

US 2019/0047683 A1 Feb. 14, 2019

(51) Int. Cl.
*B64C 13/08* (2006.01)
*B64D 45/00* (2006.01)
*B64C 13/50* (2006.01)
*G01M 1/12* (2006.01)
*B64C 13/10* (2006.01)

(52) U.S. Cl.
CPC ............ *B64C 13/08* (2013.01); *B64C 13/503* (2013.01); *B64D 45/0005* (2013.01); *G01M 1/125* (2013.01); *B64C 13/10* (2013.01)

(58) Field of Classification Search
None
See application file for complete search history.

(56) References Cited

U.S. PATENT DOCUMENTS

| 4,110,605 | A | * | 8/1978 | Miller | G01G 19/07 |
| | | | | | 701/124 |
| 4,937,754 | A | | 6/1990 | Buisson et al. | |
| 4,949,269 | A | * | 8/1990 | Buisson | G01M 1/127 |
| | | | | | 701/124 |
| 5,047,942 | A | * | 9/1991 | Middleton | G05D 1/0083 |
| | | | | | 701/15 |
| 2014/0249700 | A1 | * | 9/2014 | Elias | G01M 1/127 |
| | | | | | 701/14 |
| 2016/0185446 | A1 | | 6/2016 | Miyoshi | |
| 2017/0284856 | A1 | * | 10/2017 | Hagerott | G01P 5/16 |
| 2019/0086937 | A1 | * | 3/2019 | Lee | G05D 1/0816 |

FOREIGN PATENT DOCUMENTS

| EP | 0 743 582 A2 | 11/1996 |
| EP | 2 772 732 A1 | 9/2014 |

OTHER PUBLICATIONS

Boeing 777 Flight Management System Pilot's Guide, Honeywell, Phoenix, AZ, Oct. 2001 (Year: 2001).*
Extended European Search Report for corresponding EP18188509, dated Dec. 18, 2019; 7 pages.

* cited by examiner

*Primary Examiner* — Christian Chace
*Assistant Examiner* — Katherine Marie Fitzharris
(74) *Attorney, Agent, or Firm* — Nixon & Vanderhye, P.C.

(57) ABSTRACT

A method converts an aircraft takeoff trim setting that would be a function of several parameters to a value that is a function of CG position only. In this way, it is possible to create a direct simple equivalence between Stabilizer angle and CG. The equivalent CG can be presented in real time to the pilot.

20 Claims, 8 Drawing Sheets

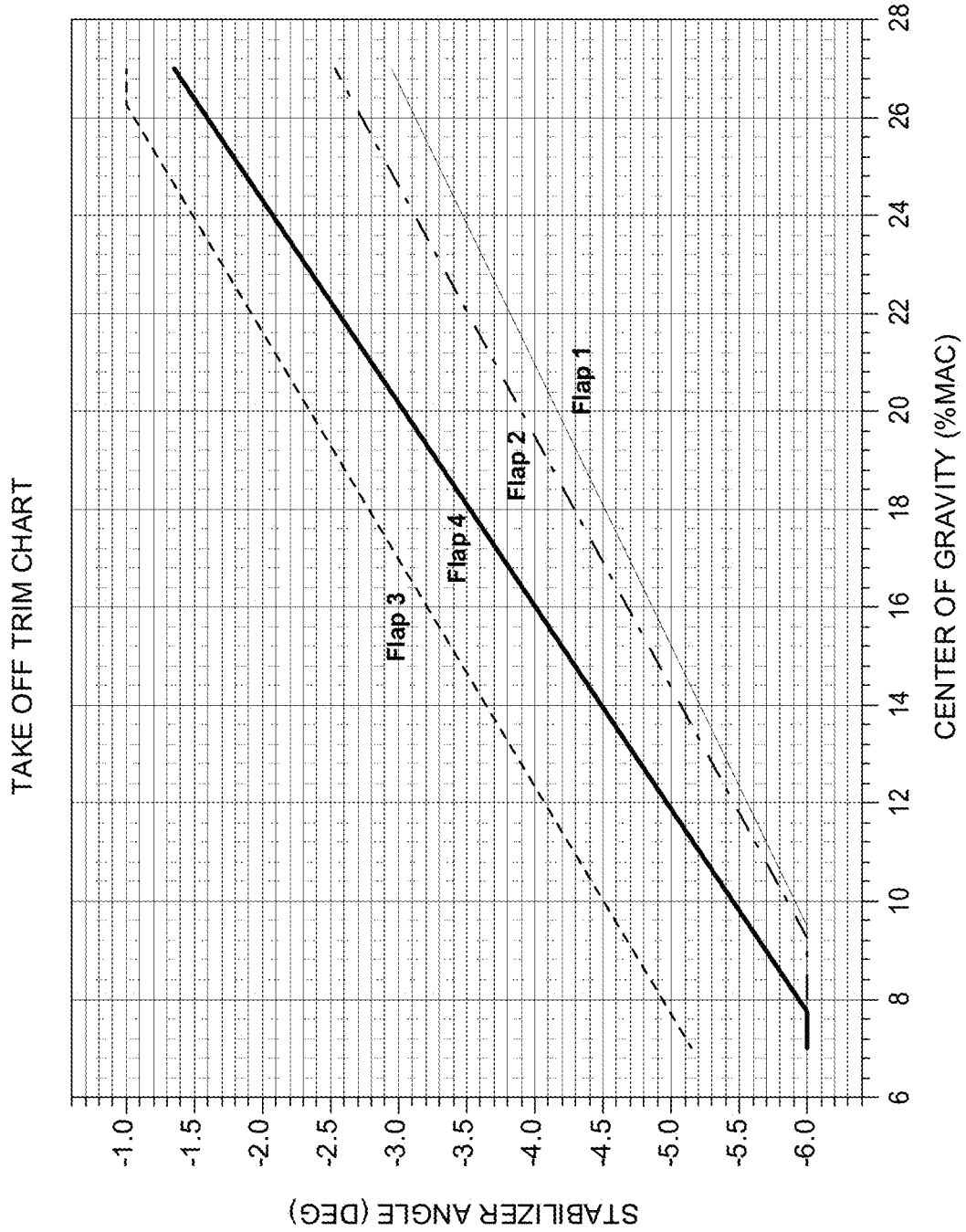
Figure 4 - Typical takeoff trim position of an aircraft

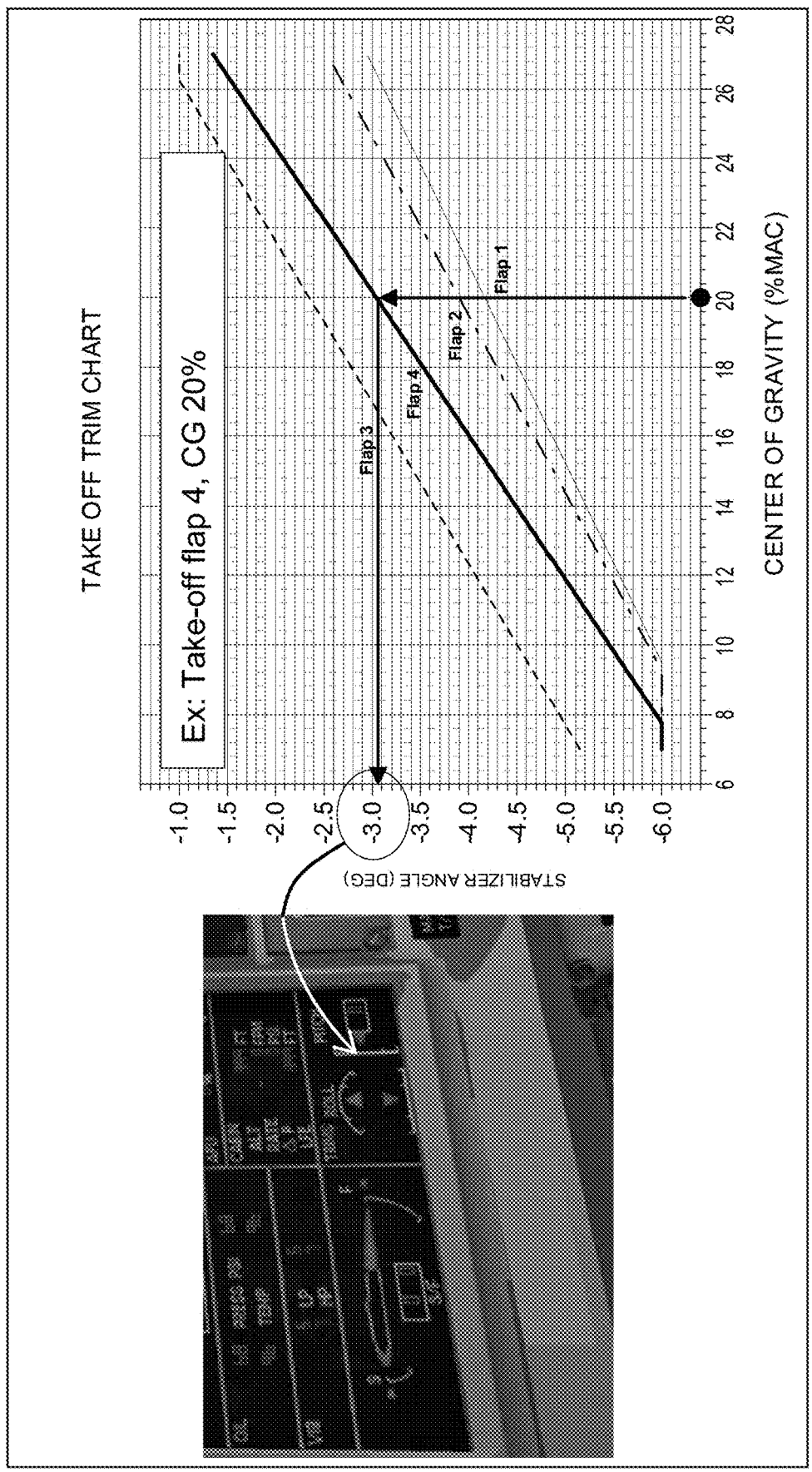
Figure 5 - Process to calculate and set the aircraft take off trim position

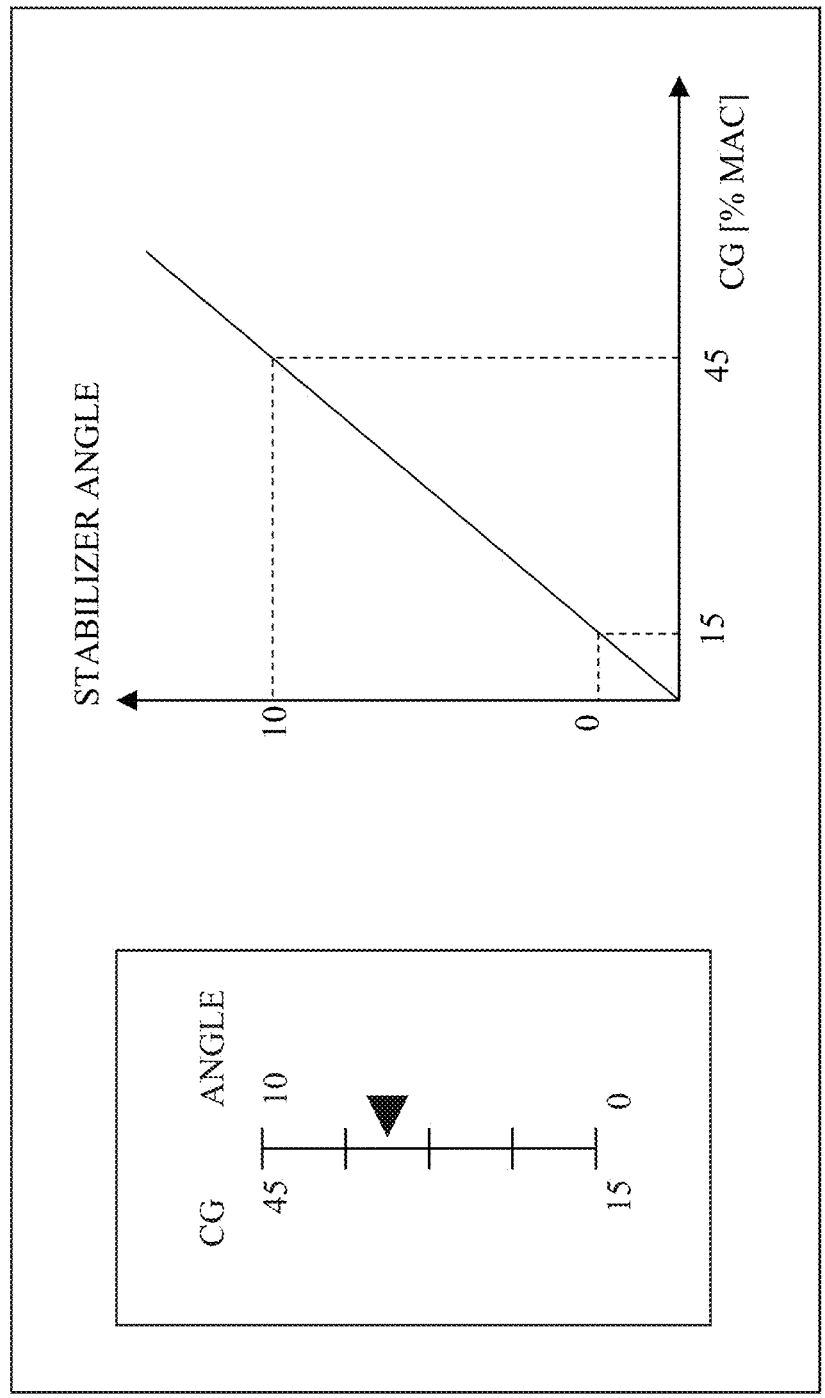
Figure 6 - Trim position Scale conversion for aircrafts where the trim position is a function of CG position only

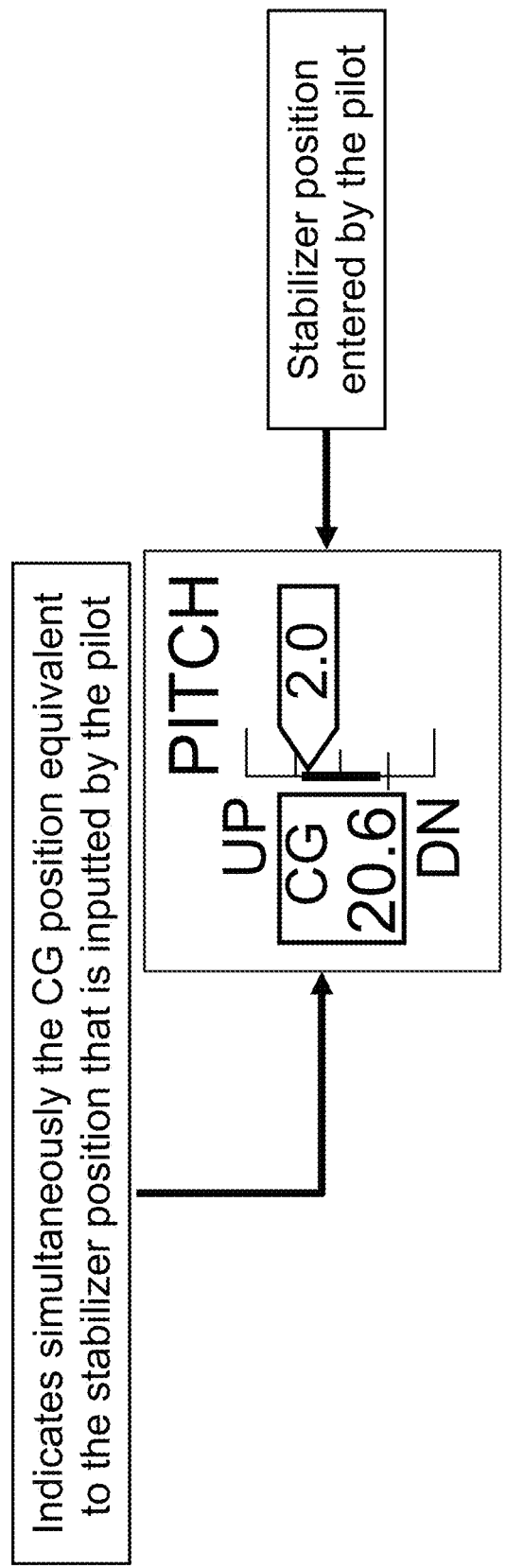
Figure 7 - Indication of the equivalent CG TRIM position

ENHANCED TAKEOFF TRIM INDICATION

CROSS-REFERENCE TO RELATED APPLICATIONS

None.

STATEMENT REGARDING FEDERALLY SPONSORED RESEARCH OR DEVELOPMENT

None.

FIELD

The example non-limiting technology relates to aircraft cockpit indications, and more particularly to automatic systems, methods and memory storage devices enabling aircraft takeoff trim adjustment calculation and indication.

BACKGROUND

Aircraft commonly have controls that enable the pilot to "trim" the pitch, i.e., the "nose up"/"nose down" attitude of an aircraft. A "nose up" pitch generally means the aircraft is increasing in altitude, whereas a "nose down" pitch generally means the aircraft is decreasing in altitude. Keeping the aircraft's pitch in a neutral attitude when the controls are in a neutral position is typically desirable.

One way to do this is to "trim" the pitch based on the current airspeed, thrust and other factors so the neutral position of the yoke or other inceptor provides level flight with no moment forcing the nose up or down. Trimming neutralizes the force required to keep control surfaces in a specific position. A properly trimmed aircraft relieves the pressure on the elevator control, or the force the pilot must exert to keep the plane level. Using the natural stability of the airplane in combination with the pitch trim can permit much smoother flight control and reduced pilot workload.

Most aircraft have a pitch trim control that sets a "nose up", "nose down" or neutral pitch when the yoke (which typically controls the elevator and/or other pitch control surface) is in its neutral position. In small aircraft, pitch trimming is usually accomplished by means of moveable trim tabs on the elevator control surfaces which are controlled by a trim wheel or other trim control in the cockpit. For example, rotating the tab downward develops an upward lift on the trim tab, which rotates the elevator up to a desired trim angle. With proper adjustment of the trim tab, the elevator moves to the required trim angle for the desired speed, and the force on the control stick required to maintain desired pitch attitude goes to zero. In larger aircraft, pitch trimming is often performed by a processor operating a motor to control the angle/position of the horizontal stabilizer, to which the elevator is attached (see FIG. 1).

While pitch trim can be adjusted after the aircraft is underway, it is often set at takeoff to establish a nose up/nose down bias to account for where the center of gravity (CG) of the aircraft is located. In this context, "CG" means the average location of the center of gravity of the aircraft (i.e., the center of mass of the overall airplane)—which has a particular known location for an empty airplane but can vary with amount of fuel, passenger/cargo loading and other factors.

BRIEF DESCRIPTION OF THE DRAWINGS

The following detailed description of exemplary non-limiting illustrative embodiments is to be read in conjunction with the drawings of which:

FIG. 4 shows typical takeoff trim position control of an aircraft;
FIG. 5 shows an example non-limiting process to calculate and set the aircraft take off trim position;
FIG. 6 shows trim position Scale conversion for aircrafts where the trim position is a function of CG position only;
FIG. 7 shows an example non-limiting indication of the equivalent CG TRIM position.

DETAILED DESCRIPTION OF PREFERRED EMBODIMENTS

The example non-limiting technology herein presents functionality that simplifies the process of setting takeoff trim position for aircraft with a multi-parameter dependent takeoff trim position (generally large aircrafts), allowing the pilot to configure the takeoff trim in a way that is easier than the prior procedure and also reduces the possibility of errors due to miscalculations.

The example non-limiting technology applies to aircraft with a multi-parameter dependent takeoff trim and where all the parameters used on the takeoff trim definition (except the cg position) are available to a processing unit such as the flight control module to perform the necessary calculations.

Example Automatic Fly-by-Wire Pitch Trim System

Figure 2:
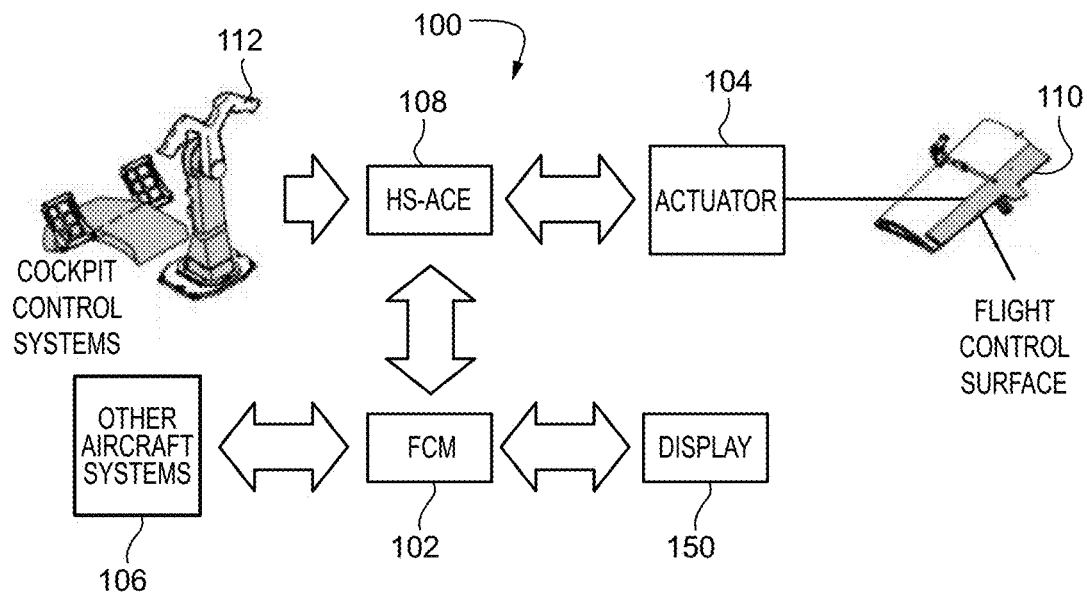
FIG. 2 shows an example non-limiting horizontal stabilizer control system.

In some aircraft, pitch trim can be manually inputted and then adjusted through switches installed on the control columns, which actuate the trim motor. FIG. 2 shows an example onboard aircraft cockpit control system 100 including at least one flight control module processor (FCM) 102 that is programmed and configured to generate a horizontal stabilizer position motor control signal to set the trim angle/position of the horizontal stabilizer pitch flight control surface 110. In such an example system 100, the flight control module processor (FCM) 102 receives inputs from cockpit control systems 112 (e.g., including the yoke or other inceptor) and other aircraft systems 106 such as sensor outputs including calibrated air speed and stored values such as load factor, and provides outputs to a fly-by-wire (FBW) system including HS-ACE (horizontal stabilizer actuator control electronics) 108. The FCM 102 executes program code instructions stored in a non-transitory memory that generate, in response to such inputs, electronic control signals that the FCM provides via HS-ACE 108 to an actuator 104 such as an electric motor and/or a hydraulic actuator. In this particular example, the cockpit control systems 112 may also provide inputs directly to HS-ACE 104. When active, the actuator 104 changes the position of the horizontal stabilizer pitch flight control surface 110 based on the control signals it receives from the FCM processor 102 via the HS-ACE 108. As the inputs change, the FCM 102 uses a control law to update the control signals which causes the actuator 104 to change the position of the flight control surface 110, thereby adapting the pitch of the aircraft to the changing inputs including pilot control inputs 112 and other inputs relating to the aircraft flight environment, the current state of the aircraft (including weight amount and distribution) and the like.

Figure 3:
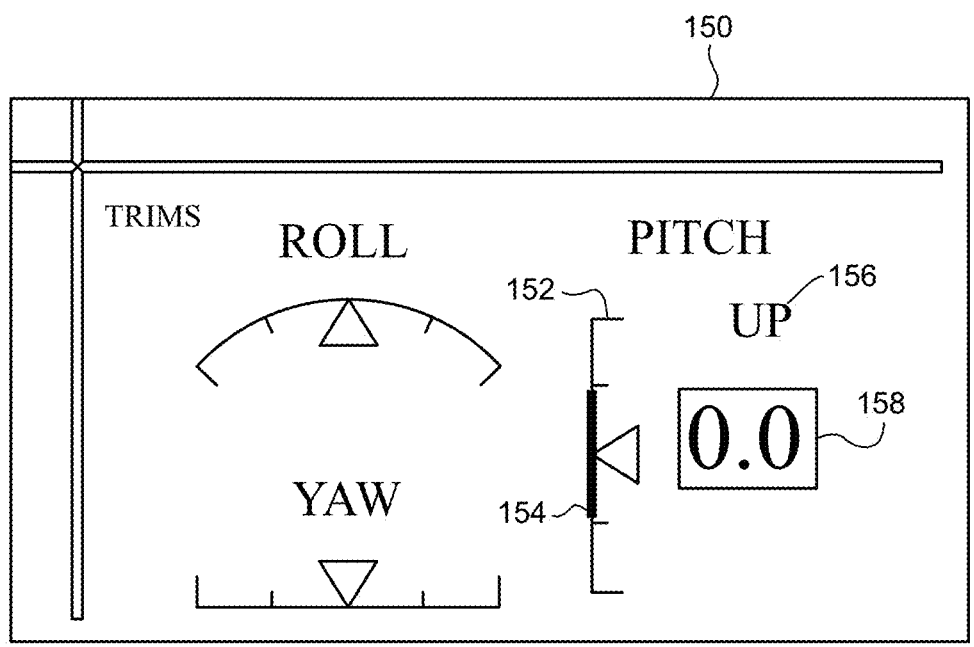
FIG. 3 shows an example non-limiting aircraft trim electronic display.

FIG. 3 shows typical example trim indications on an example non-limiting electronic display 150 (operatively coupled to the FCM 102) used to inform the pilot of the current trim state of the aircraft. The trim positions in each axis are indicated by pointer arrows. Three trims (pitch, yaw, roll) are shown, one for each degree of freedom of the aircraft. The pitch trim indication (to the right) shows the amount (angle) of pitch trim as well as the direction (up or down) of the current pitch relative to the set trim. In particular, the tic marks 152 on the pitch trim indication may indicate a series of pitch trim angles such as for example 4°, 0.25°, −3.5°, −7.25° and −11°. The position of the arrow indicator relative to these tic marks indicates pitch trim. A digital numerical indication 158 may indicate the horizontal stabilizer angular position in degrees, with "UP" and "DN" indicator 156 indicating pitch up or pitch down (above or below) the readout according to the trim set.

It is desirable to set an appropriate pitch trim before takeoff to make the controls easier to manipulate during takeoff. To that end, as shown in FIG. 3, a "green" band 154 extending from e.g., 2° to −4° may be displayed during takeoff to indicate allowable pitch trim position range for takeoff By looking at the position of the arrow relative to band 154, the pilot can know that the dialed-in pitch trim is out of a correct range for takeoff But this indication does not tell the pilot what the correct pitch trim should be—only what it should not be.

FCM 102 Use of Multi-Dimensional Table to Set Takeoff Pitch Trim

In the past, for some aircraft the adjustment of takeoff pitch trim (e.g., horizontal stabilizer angle) was performed using a multidimensional table that is a function of several parameters such as flap, slat, weight, CG, etc. This additional complexity was usually implemented in order to achieve a good balance between factors such as performance, handling and failure conditions. The takeoff pitch trim value can be calculated by the FCM 102 onboard the aircraft—or often by other computers external to the aircraft and provided to the pilot for input into the FCM before takeoff.

Figure 1:
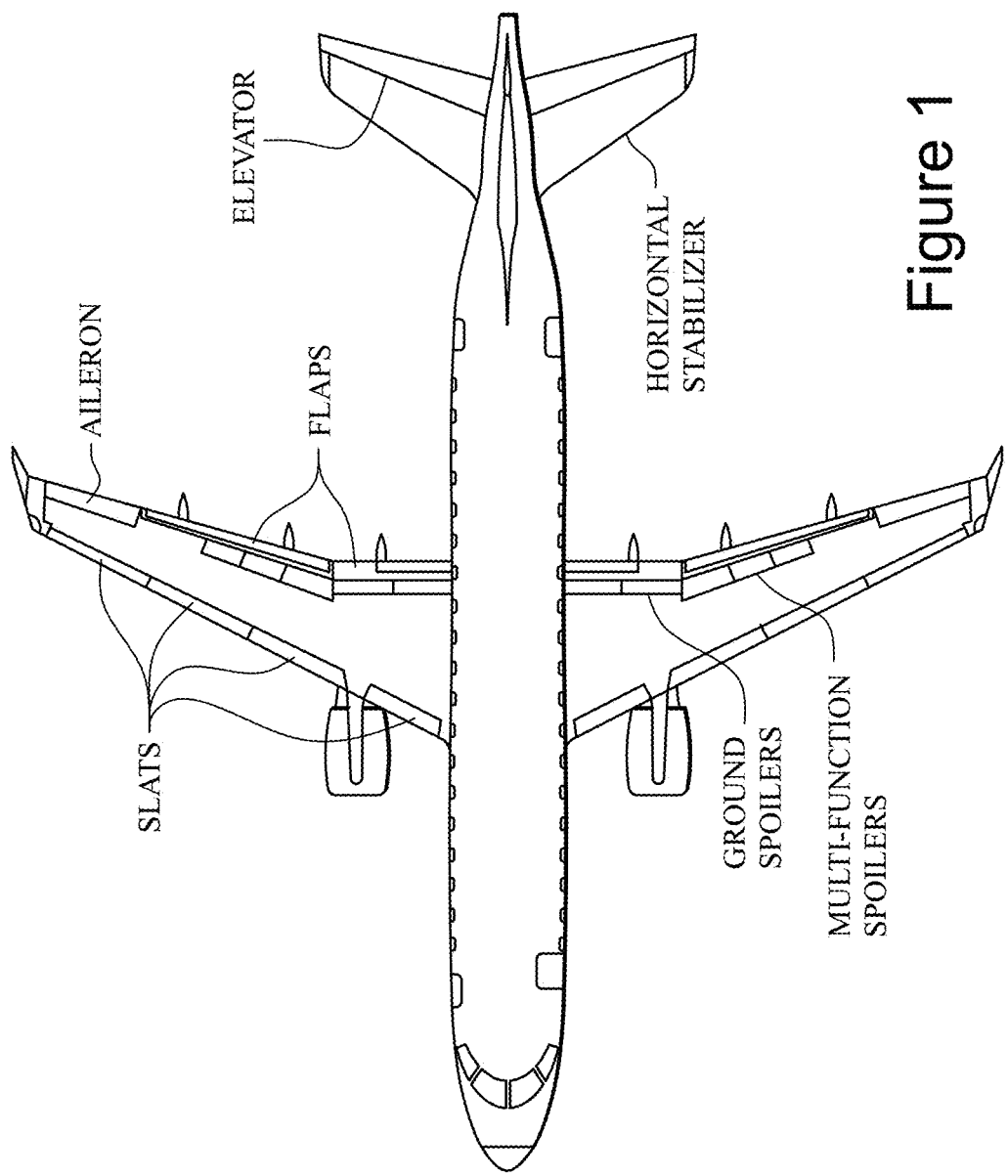
FIG. 1 shows control surfaces of an example aircraft.

FIG. 4 presents an example lookup function (which can be stored in a table) where the takeoff trim (horizontal stabilizer angle in degrees) is determined or calculated as a function of flap position and CG position (% MAC or Mean Aerodynamic Chord). The stabilizer position is determined as a function of center of gravity, but is also determined by the position of the flaps on the wings (see FIG. 1). Different flap positions generate different amounts of lift and so can change the pitch attitude of the aircraft. In particular, flap extension has a definite effect on the airplane's pitch behavior. The increased camber from flap deflection produces lift primarily on the rear portion of the wing, producing a nose-down force. The precise effect of each flap extension on an aircraft depends on the particular aircraft.

For example, FIG. 4 shows that the "Flap 4" position correlates to a more negative horizontal stabilizer position for takeoff (in degrees) as compared to a "Flap 3" position but a less negative horizontal stabilizer position for takeoff as compared to a "Flap 2" position. The chart also shows that dependence of horizontal stabilizer position on center of gravity for takeoff is generally linear, but the particular linear function depends on flap position.

Figures 4A, 4B:
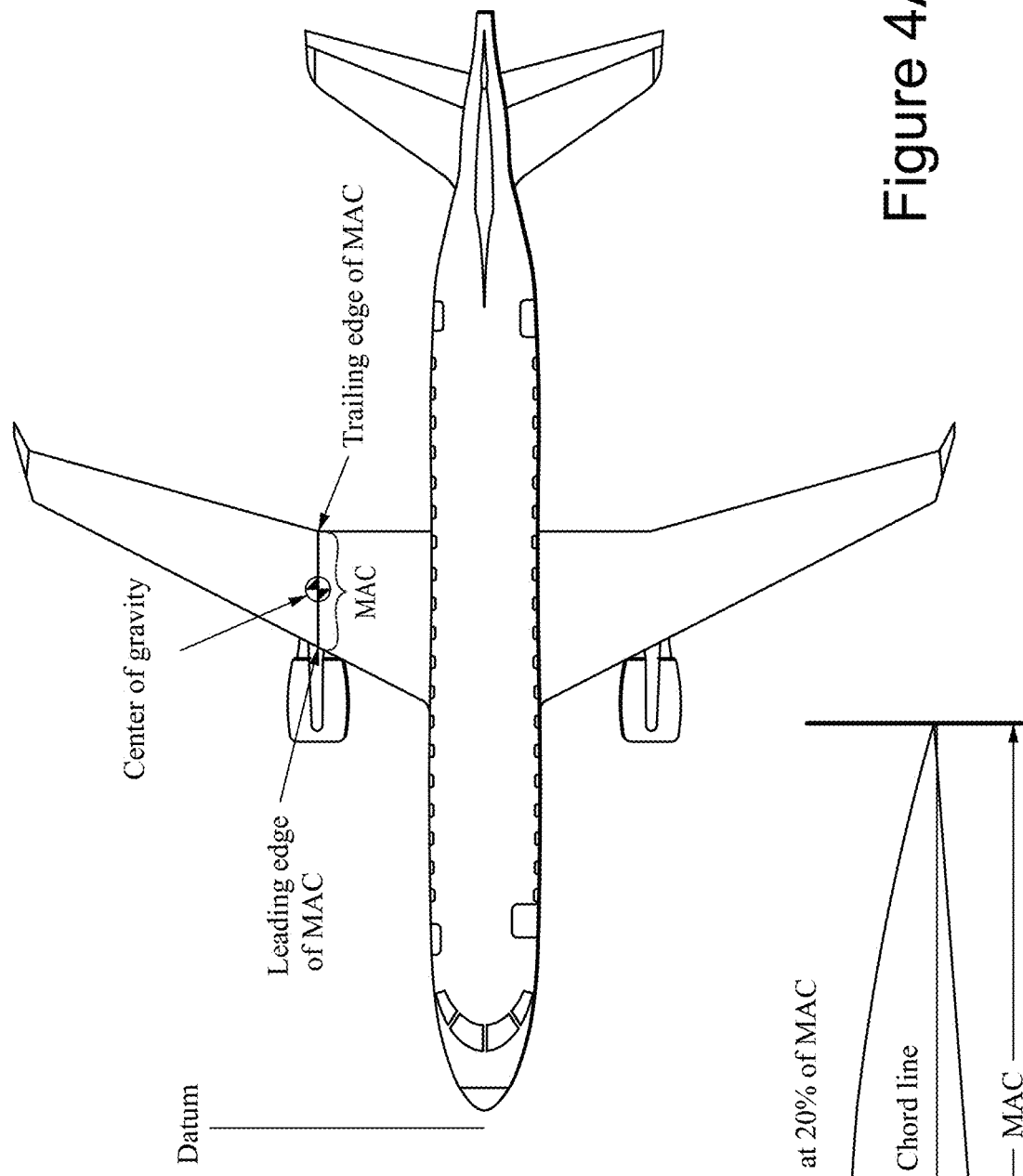
FIGS. 4A and 4B shows indication of center of gravity (CG) in terms of percentage of the mean aerodynamic chord.

Note that in FIG. 4, Center of Gravity (CG) is defined as "% MAC". By way of further explanation, center of gravity ("CG") in this context is typically identified in relation to the width of the wing—which is known as the "chord." The width of a wing that is tapered and/or swept back is different along its entire length. See FIGS. 4A and 4B. As FIGS. 4A and 4B illustrates, the width is greatest where the wing meets the fuselage and progressively decreases toward the tip. In relation to the aerodynamics of the wing, the average length of the chord on these tapered swept-back wings is known as the mean aerodynamic chord ("MAC"). Read more at www.flight-mechanic com/mean-aerodynamic-chord.

On such airplanes, the CG is identified as being at a location that is a specific percentage of the mean aerodynamic chord (% MAC). For example, imagine that the MAC on a particular airplane is 100", and the CG falls 20" behind the leading edge of the MAC. That means it falls one-fifth of the way back, or at 20% of the MAC. See FIGS. 4A and 4B.

For aircraft with take-off trim that is dependent on multiple parameters, in order to configure the dispatch prior to takeoff, it is necessary to interpolate the table of stored values such as depicted in FIG. 4 using the takeoff parameters to obtain the takeoff trim position. An example such process for determining and setting takeoff pitch trim is presented on FIG. 5. The horizontal stabilizer angle in degrees is calculated by at least one processor in the FCM 102 based on the center of gravity of the airplane (which is based for example on the configuration of the airplane as well as number of passengers, amount of fuel, amount of cargo, etc.) input to the FCM. This horizontal stabilizer angle in degrees is displayed as a numerical value on the FIG. 3 Pitch Trim display (which is shown in the left-hand breakout electronic display of FIG. 5 on the lower right-hand corner of the display). For example, if the flaps are in position 4 and the CG is 20% MAC, the FCM 102 determines and displays a horizontal stabilizer angle of −3.0° on the electronic display and uses this value to set the angular position of the horizontal stabilizer.

For some small aircraft, where the takeoff trim position may be a function of CG position only (i.e., no flap position needs to be accounted for), the adjustment of the takeoff trim position may be simplified using a simple scale conversion as exemplified on FIG. 6. In this case, the stabilizer angle is determined as a function of CG without the need to calculate based on flap position.

In commercial aviation, these calculations are typically transparent to the pilot. The pilot just needs to configure the aircraft with the calculated takeoff trim position that is given to him or her by the FCM 102 or by dispatch personnel. In such situations, the pilot does not calculate or determine pitch trim and so is merely inputting a value that has been provided to him or her, with no readily available ability to recalculate or recheck the value. Even when a military pilot calculates his or her own pitch trim, the prior art methodology generally does not perform any intermediate sanity check of the entered values, except by the verification that checks if the "green band" (e.g., 2° to −4°) limits have been exceeded (extreme condition).

Some difficulties have sometimes been observed in the past:
  The takeoff trim position may be miscalculated
  Identifies operation errors only for extreme conditions (outside green band limits)
  Low agility (relevant mostly or only to military operations). In military operations, there are situations where the pilot (for tactical reasons) is responsible for calculating the trim position that should be used.

Calculating an Inverse Function to Check Trim Position

The takeoff trim position is very frequently a function f of CG position and other parameters including but not limited to flap position. For example:

$$\text{Takeoff TRIM} = f(\text{flap}, \text{slat}, \text{CG}).\quad\quad\text{(Equation 1)}$$

In the equation above, Takeoff Trim position is a function of three factors: (a) flap position, (b) slat position, and (c) center of gravity.

The example non-limiting technology herein calculates an inverse function f' in order to obtain the equivalent TRIM CG position, by solving the above equation for CG (where f' is the inverse function of f):

$$\text{CG TRIM} = f'(\text{TO trim}, \text{flap}, \text{slat}).\quad\quad\text{(Equation 2)}$$

In other words, in this example Center of Gravity Trim is calculated as a function of takeoff Trim ("TO Trim"), flap position and slat position.

The FCM 102 calculates this CG Trim and indicates the calculated CGTRIM position value on display 150 simultaneously as the pilot adjusts the TRIM position as shown in FIG. 7. In particular, FIG. 7 shows a new displayed indication ("CG TRIM") that indicates simultaneously the CG position that is equivalent to the horizontal stabilizer position that is inputted by the pilot. Thus, in FIG. 7 the "2.0" stabilizer position is the angle of the horizontal stabilizer inputted by the pilot. The FCM 102 meanwhile uses this inputted stabilizer position to automatically calculate the equivalent "CG Trim" CG position of "20.6" % MAC which it displays on the same display. The displayed "CG Trim" position changes in real time as the pilot inputs different stabilizer positions or different stabilizer positions are otherwise determined. The pilot can compare the indicated "CG Trim" position with the actual known CG position as a back or cross-check to ensure the inputted stabilizer position is correct for the CG of the aircraft as currently loaded.

Summary of Past and New Techniques

Figure 8C:
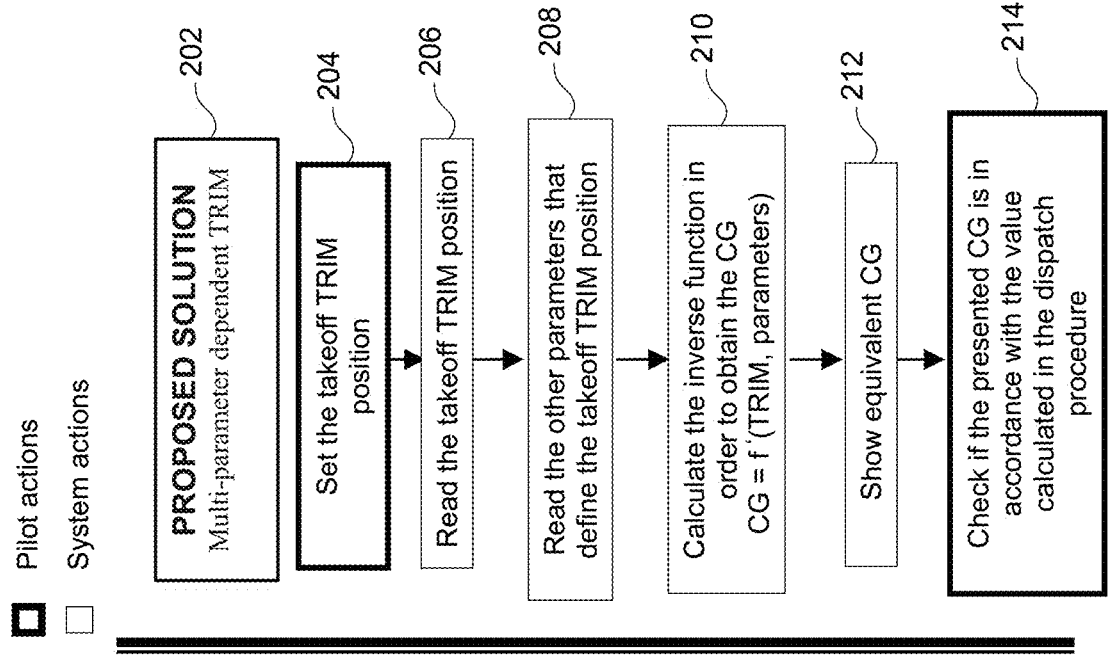
FIGS. 8A, 8B and 8C shows prior art and proposed new solution processes.
Figure 8B:
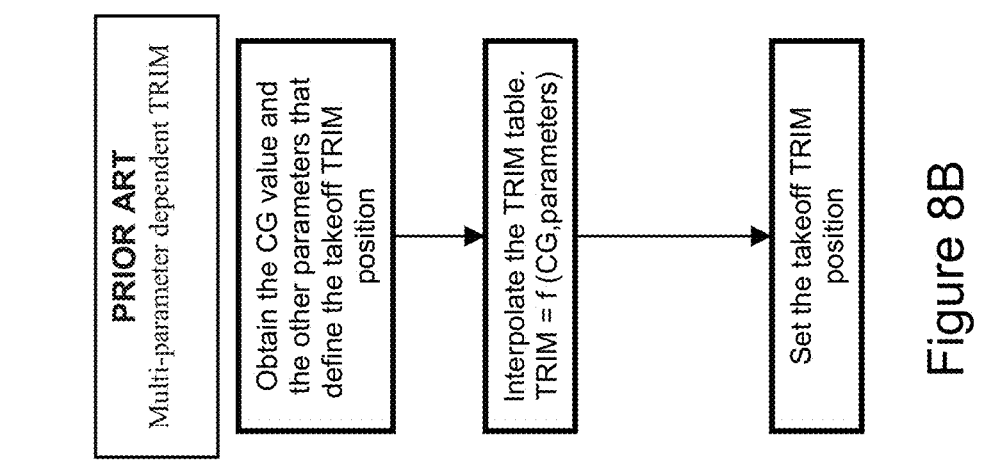
Figure 8A:
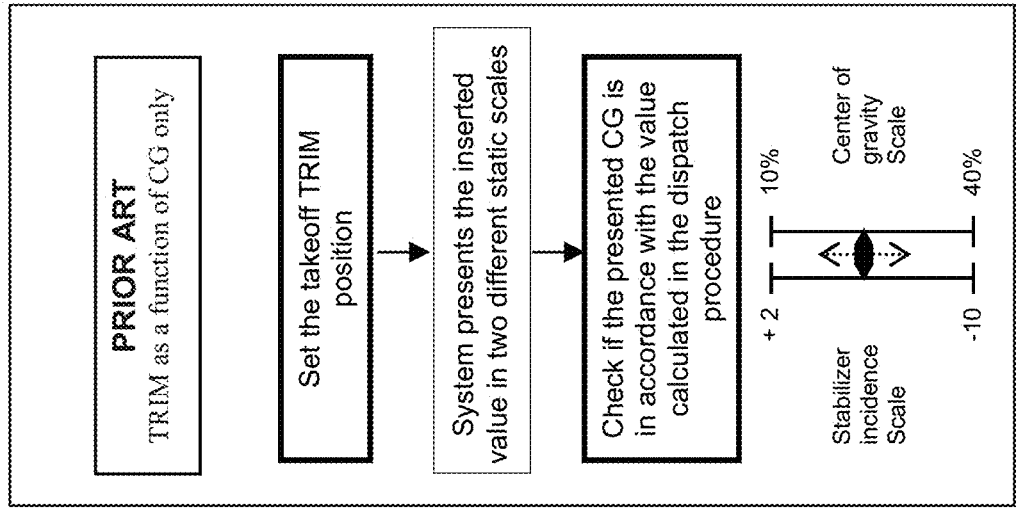

For purposes of illustration without any intent to be limiting, FIGS. 8A, 8B and 8C show two prior art methods and an example non-limiting embodiment herein. One can see that in the FIG. 8A prior art process shown on the left in which trim is a function of CG only, one defined trim position is displayed on two different static scales (e.g., −10 to +2 stabilizer incidence scale, and 40% to 10% center of gravity scale). The pilot merely checks the displayed center of gravity against the value calculated in the dispatch procedure.

In the FIG. 8B prior art process shown in the center, a multi-variable Trim Table is interpolated based on CG to obtain a takeoff trim position that is displayed. There is no easy way to check the calculated takeoff trim position to ensure it makes sense (the only checking is to ensure it is within the "green" band discussed above).

In the new non-limiting example process 202 shown in FIG. 8C (on the right), the pilot sets the takeoff trim position (block 204) just as for small aircraft where the pitch trim is a function of CG only—and unlike larger aircraft where the FCM 102 obtains the CG value and other parameters that define the takeoff trim position. In the current embodiment, the FCM 102 executes instructions to read the takeoff trim position (block 206) the pilot has set, and then executes further instructions that reads the other parameters (e.g., flap and slat positions and the horizontal stabilizer position) that define the takeoff trim position (block 208). The FCM 102 then executes instructions to automatically calculate the inverse function discussed above (see Equation 2) in order to obtain the equivalent CG Trim value (block 210). The FCM 102 then displays the calculated CG Trim value that is equivalent to the takeoff trim position the pilot has set (block 212).

As noted above, this displayed "CG Trim" value is not a trim value, but rather it is an equivalent CG position (e.g., % MAC) that is back-calculated from the inputted pitch trim value. The FCM 102 calculates this equivalent CG position based e.g., on a takeoff trim table that correlates the takeoff trim position with at least the aircraft center of gravity; where the FCM uses the aircraft actual inputted pitch trim position and the other actually set configuration parameters to interpolate the referred trim table (see FIG. 4) in order to calculate the center of gravity that is correlated to inputted pitch trim. The FCM 102 performs this calculation based on e.g., a takeoff trim table or other calculations that correlates the takeoff trim position with the aircraft center of gravity, flap and slat position; where the aircraft actually-set pitch trim, flap and slat positions are used to interpolate the referred trim table or other calculations in order to determine the center of gravity that is correlated to inputted pitch trim.

The pilot may then read the displayed "CG Trim" value and use it to check whether it is in accordance with the aircraft's CG position value calculated in or otherwise provided by the dispatch procedure (block 214). The pilot may make corrections (or request recalculation) if the displayed "CG Trim" value does not match what the pilot believes is the actual CG value.

In a further embodiment, the FCM 102 can perform the comparison between the inputted (or dispatched) CG position value and the back-calculated CG position value, and generate an audible and/or visual alert (and/or a correction signal) if the two do not agree within a certain predetermined tolerance.

Example Non-Limiting Advantages
  Minimizes miscalculations.
    Eliminates the necessity of interpolating a table with several parameters
  Provides agility in some military operations
    The pilot adjusts the takeoff trim based on a CG estimate only
  Increases safety in case of civil operations
    The pilot receives the trim position generated by the team that calculated the dispatch of the aircraft. The pilot adjusts (inputs) this trim value and checks whether the indicated corresponding CG position beats the programmed CG position (cross-check);
    If the pilot enters a wrong trim setting (still inside the green takeoff band), he will be able to detect the error by checking that the equivalent CG trim is different from the CG calculated for the dispatch. In the prior art, pilot is warned only if the error is sufficient to exceed the green band limits (extreme condition);
    The system also permits the pilot to detect possible errors on flap/slat positioning once that in this situation the equivalent CG trim is different from the CG calculated for the dispatch.

The example non-limiting technology thus provides a method that converts the takeoff trim setting that would be a function of several parameters in a trim setting that is a function of CG position only. In this way, it is possible to create a direct simple equivalence between Stabilizer angle and CG. The equivalent CG can be presented in real time to the pilot.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. An indication method for an aircraft having a center of gravity, comprising:
   receiving a horizontal stabilizer trim entered by a pilot;
   with at least one processor on board an aircraft, using the received horizontal stabilizer trim entered by the pilot to generate a center of gravity trim value that corresponds to the received horizontal stabilizer trim entered by the pilot; and
   displaying, on an aircraft instrument panel, the generated center of gravity trim value that corresponds to the received horizontal stabilizer trim entered by the pilot for comparison with a displayed aircraft center of gravity position.

2. The indication method of claim 1 further including displaying the center of gravity trim value as a % of a mean aerodynamic chord.

3. The indication method of claim 1 further including updating the displaying in real time in response to the pilot entering changes to the horizontal stabilizer trim before takeoff.

4. The indication method of claim 1 wherein the displaying includes displaying, on an electronic display, the center of gravity trim value proximate to an indication of a displayed aircraft center of gravity position.

5. The indication method of claim 1 further including the at least one processor comparing the center of gravity trim value with the aircraft center of gravity position.

6. The indication method of claim 1 wherein the at least one processor generates the center of gravity trim value by performing a function based on the horizontal stabilizer trim entered by the pilot and pre-takeoff flap position and/or slat position.

7. The indication method of claim 1 wherein the at least one processor determines the center of gravity trim value based on a takeoff trim table, wherein the received horizontal stabilizer position trim entered by the pilot for takeoff and other configuration parameters that do not require the aircraft to be moving are used to interpolate the takeoff trim table to derive the center of gravity trim value that corresponds to the received horizontal stabilizer trim.

8. The indication method of claim 1 wherein the at least one processor generates the center of gravity trim value based on a takeoff trim table that correlates an entered takeoff horizontal stabilizer trim with flap and/or slat position to interpolate between values of the takeoff trim table to thereby generate the center of gravity trim value that corresponds to the received horizontal stabilizer trim.

9. A before-takeoff pitch trim indication system comprising:
   an input circuit that receives (a) a horizontal stabilizer trim entered by a pilot, and (b) a position of flaps and/or slats;
   at least one processor operatively coupled to the input circuit, the at least one processor deriving a center of gravity trim value corresponding to the horizontal stabilizer trim entered by the pilot by performing a function based on the horizontal stabilizer trim entered by the pilot and the position of the flaps and/or slats, the derived center of gravity trim value corresponding to the entered horizontal stabilizer trim; and
   an electronic display coupled to the at least one processor, the electronic display displaying the derived center of gravity trim value that corresponds to the entered horizontal stabilizer trim.

10. The indication system of claim 9 wherein the at least one processor derives the center of gravity trim value based on the entered horizontal stabilizer trim and a pre-takeoff position of at least one of flaps and slats.

11. The indication system of claim 9 wherein the display displays the derived center of gravity trim value as % of a mean aerodynamic chord.

12. The indication system of claim 9 wherein the at least one processor updates the displayed center of gravity trim value in real time in response to the system receiving changing pilot inputs specifying different pre-takeoff horizontal stabilizer trims.

13. The indication system of claim 9 wherein the display displays the center of gravity trim value in proximity to pretakeoff aircraft center of gravity position.

14. The indication system of claim 9 wherein the at least one processor is configured to compare the derived center of gravity trim with aircraft pre-takeoff center of gravity position.

15. The indication system of claim 9 wherein the at least one processor is configured to take into account pre-takeoff flap position and/or slat position in deriving the center of gravity trim value.

16. The indication system of claim 9 wherein the at least one processor calculates the center of gravity trim based on a takeoff trim table that correlates a takeoff horizontal stabilizer trim with at least an aircraft center of gravity.

17. The indication system of claim 9 wherein the at least one processor calculates the center of gravity trim based on a takeoff trim table that correlates a pilot-entered takeoff horizontal stabilizer trim with an aircraft center of gravity and flap and/or slat position; wherein the horizontal stabilizer trim and flap and/or slat positions are used to interpolate between values of the takeoff trim table in order to calculate the center of gravity trim.

18. The indication system of claim 9 further including an actuator that controls horizontal stabilizer position in response to the entered horizontal stabilizer trim.

19. An aircraft comprising:
   a horizontal stabilizer;
   at least one of flaps and slats;
   an actuator operatively coupled to the horizontal stabilizer, the actuator controlling the position of the horizontal stabilizer to trim pitch of the aircraft;
   an aircraft control panel including an input circuit that receives a horizontal stabilizer pitch trim entered by a pilot for takeoff; and
   a flight control computer comprising at least one processor operatively coupled to the input circuit and the actuator, the at least one processor being configured to perform operations comprising (a) causing the actuator to control a position of the horizontal stabilizer in response to the horizontal stabilizer pitch trim entered by the pilot for takeoff and position of the at least one of flaps and slats, and (b) using an inverse function to derive a center of gravity trim value that corresponds to the horizontal stabilizer pitch trim entered by the pilot for takeoff and the position of the at least one of flaps and slats, the derived center of gravity trim value for comparison with an aircraft center of gravity position;
   the aircraft control panel further including an electronic display operatively coupled to the at least one processor, the electronic display displaying the entered horizontal stabilizer pitch trim for takeoff and the derived corresponding center of gravity trim value.

20. The aircraft of claim 19 wherein the processor is configured to change the display of the derived center of gravity trim value in real time response to the input circuit receiving different entered horizontal stabilizer pitch trims for takeoff.

* * * * *